(12) United States Patent
Wang et al.

(10) Patent No.: US 11,599,694 B2
(45) Date of Patent: Mar. 7, 2023

(54) METHOD FOR ASSESSING FATIGUE DAMAGE AND A FATIGUE LIFE BASED ON A CRYSTAL PLASTIC WELDING PROCESS MODEL

(71) Applicant: Sichuan University, Chengdu (CN)

(72) Inventors: Qingyuan Wang, Chengdu (CN); Hong Zhang, Chengdu (CN); Yongjie Liu, Chengdu (CN); Chong Wang, Chengdu (CN); Lang Li, Chengdu (CN); Chao He, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 334 days.

(21) Appl. No.: 16/874,690

(22) Filed: May 15, 2020

(65) Prior Publication Data
US 2020/0394348 A1    Dec. 17, 2020

(30) Foreign Application Priority Data
Jun. 12, 2019  (CN) .......................... 201910507813.2

(51) Int. Cl.
*G06F 30/23* (2020.01)
*G01M 5/00* (2006.01)
*G06F 111/10* (2020.01)

(52) U.S. Cl.
CPC .......... *G06F 30/23* (2020.01); *G01M 5/0033* (2013.01); *G06F 2111/10* (2020.01)

(58) Field of Classification Search
None
See application file for complete search history.

(56) References Cited

U.S. PATENT DOCUMENTS

| 2008/0015827 | A1* | 1/2008 | Tryon, III | G06F 11/008 703/2 |
| 2012/0259593 | A1* | 10/2012 | El-Zein | G06F 30/23 703/1 |
| 2016/0321384 | A1* | 11/2016 | Pal | B33Y 30/00 |

FOREIGN PATENT DOCUMENTS

| WO | WO-2008036297 A2 * | 3/2008 | ........... G06F 17/505 |

* cited by examiner

*Primary Examiner* — Matthew G Marini
(74) *Attorney, Agent, or Firm* — Bayramoglu Law Offices LLC

(57) ABSTRACT

A method for assessing fatigue damage and a fatigue life based on a crystal plastic welding process model. According to the new method, consideration is given to the effects of the crystal slip system and the polycrystal plastic strain on the welding process performance of the material. A welding process damage and fatigue life assessment model is established on the mesoscopic scale. The effect of microscopic characterizations of materials on the welding process performance, as well as on the fatigue damage and life of welded joints, can be studied from the mesoscopic point of view. The relationship between the welding process and the evolution of the material performance can be determined by the macro-mesoscopic coupling calculation model to further determine the effect and degree of welding processes on the fatigue damage and life of materials.

7 Claims, 1 Drawing Sheet

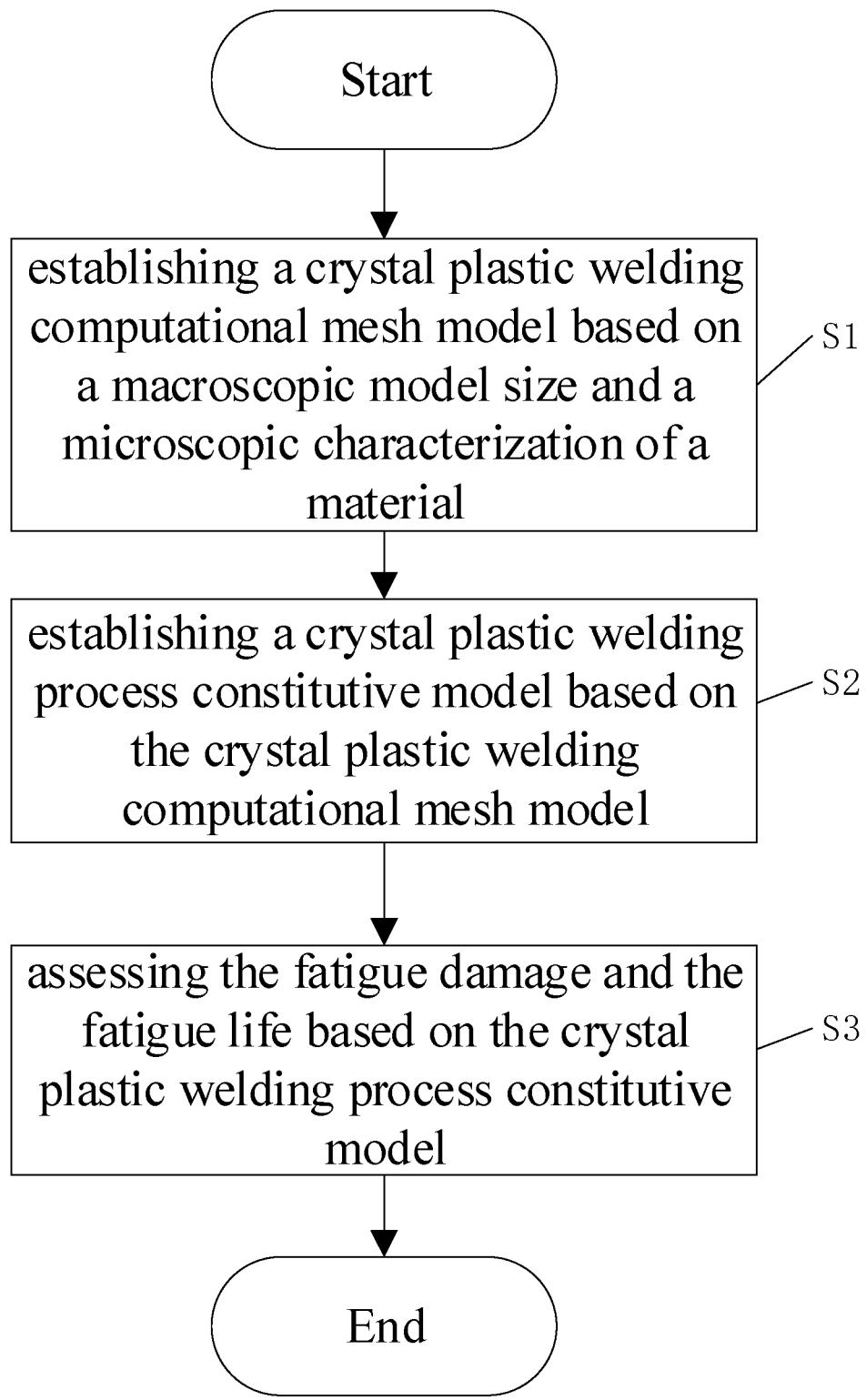

METHOD FOR ASSESSING FATIGUE DAMAGE AND A FATIGUE LIFE BASED ON A CRYSTAL PLASTIC WELDING PROCESS MODEL

CROSS REFERENCE TO THE RELATED APPLICATIONS

This application is based upon and claims priority to Chinese Patent Application No. 201910507813.2, filed on Jun. 12, 2019, the entire contents of which are incorporated herein by reference.

TECHNICAL FIELD

The present disclosure relates to the technical field of material fatigue and failure, and more particularly, to a method for assessing fatigue damage and a fatigue life based on a crystal plastic welding process model.

BACKGROUND

With advancements in welding technologies, it is now practicable to realize the engineering and manufacture of large component applications. Currently, welding is widely used in various industries. The engineering practice and research, however, have found that fatigue crack initiation and fatigue failures of a welded component typically occur at welded joints having the weakest mechanical properties. Therefore, there is significant scientific and engineering value in research pertaining to welding processes and their effect on mechanical properties. A focus of this effort involves fatigue behavior.

In general, weldability, reliability and fatigue of welded joints are studied through experimental testing. However, the experimental testing method is difficult to effectively analyze the welding and fatigue failure processes because of restrictions on the experimental conditions and costs that are associated with testing. Moreover, the research involving material stress-strain analysis, fatigue and crack initiation and propagation has not been adequately developed on a microscopic scale.

SUMMARY

In view of the above-mentioned shortcomings in the prior art, the present disclosure provides a method for assessing fatigue damage and a fatigue life based on a crystal plastic welding process model. The novel method solves problems in the prior art, namely, the macro-mesoscopic coupling behavior, fatigue damage and life prediction of materials are not considered during the numerical calculation of the welding process.

In order to achieve the above-mentioned objective of the present disclosure, the technical solution adopted by the present disclosure is as follows: A method for assessing fatigue damage and a fatigue life based on a crystal plastic welding process model, including the following steps:

S1, establishing a crystal plastic welding computational mesh model based on a macroscopic model size and a microscopic characterization of a material;

S2, establishing a crystal plastic welding process constitutive model based on the crystal plastic welding computational mesh model;

S3, assessing fatigue damage and a fatigue life based on the crystal plastic welding process constitutive model.

Further, step S1 specifically includes the following steps:

S11, generating, by an image pixel discretization technology, coordinate information of a crystal grain and a crystal nucleus on a mesoscopic scale of a welding area based on the macroscopic model size and information of the microscopic characterization of the material;

S12, using, by a Voronoi algorithm, the coordinate information of the crystal grain and the crystal nucleus, to generate a two-dimensional crystal model map or a three-dimensional crystal model map;

S13, using, by the finite element mesh generation software, the two-dimensional crystal model map or the three-dimensional crystal model map to generate a mesoscopic Voronoi crystal plastic mesh model according to a requirement for a macroscopic simulation of a welding process;

S14, constructing a mesh model by adding a property of the material, a parameter of the welding process and fixture constraint information to the mesoscopic Voronoi crystal plastic mesh model via Abaqus software;

S15, when the mesh model is validated for eligibility, outputting the mesh model; otherwise, modifying the coordinate information of the crystal grain and the crystal nucleus and returning to step S12.

Further, the information of the microscopic characterization of the material includes scanning electron microscope (SEM) information, electron back-scattered diffraction (EBSD) information, and computed tomography (CT) information.

Further, step S2 specifically includes the following steps:

S21, determining, based on the mesh model, a parameter of the crystal grain on the mesoscopic scale of the material;

S22, establishing a global coordinate elastic matrix according to the parameter of the crystal grain on the mesoscopic scale of the material;

S23, calculating a rotation increment and an expansion strain increment of a slip system according to the global coordinate elastic matrix;

S24, constructing an iterative algorithm for solving a linear equation and a nonlinear equation, and selecting a key control parameter to ensure a convergence of the iterative algorithm;

S25, using the iterative algorithm to calculate a shear strain increment of the $n^{th}$ iteration and a shear strain increment of the $(n+1)^{th}$ iteration by the rotation increment and the expansion strain increment of the slip system;

S26, iteratively calculating a consistent tangent stiffness matrix by the shear strain increment of the $n^{th}$ iteration and the shear strain increment of the $(n+1)^{th}$ iteration;

S27, when the consistent tangent stiffness matrix converges, proceeding to step S28, otherwise returning to step S24;

S28, establishing a constitutive model by the consistent tangent stiffness matrix;

S29, establishing the crystal plastic welding process constitutive model based on the constitutive model, a welding heat source theoretical model, and a macroscopic welding process parameter and constraint.

Further, the welding heat source theoretical model in step S29 includes a medium-energy welding heat source and a high-energy welding heat source;

The medium-energy welding heat source $q(x, y, z, t)$ is calculated by the following formula:

$$q(x, y, z, t) = \frac{6\sqrt{3} f_f Q}{a_f b c \pi \sqrt{\pi}} e^{-3x^2/a_f^2} e^{-3y^2/b^2} e^{-3[z+v(\tau-t)]^2/c^2},$$

where, $f_f$ represents an energy coefficient of a front end of an ellipsoid; $a_f$ represents a radius of the ellipsoid; Q represents total input energy; b represents a width of a molten pool; c represents a depth of the molten pool; x, y, and z respectively represent a parameter of the x-axis, a parameter of the y-axis, and a parameter of the z-axis in the rectangular coordinate system; v represents a welding speed; t represents a welding time; and τ represents a hysteresis coefficient;

The high-energy welding heat source Q (x,y,z) is calculated by the following formula:

$$Q(x, y, z) = Q_0 \exp\left(-\frac{x^2 + y^2}{r_0^2(z)}\right),$$

where, $r_0$ represents a radius of a lower end of the high-energy welding heat source and $Q_0$ represents the total input energy.

Further, step S3 specifically includes the following steps:

S31, establishing a damage model of a welded component according to a characteristic of a welded joint;

S32, integrating the damage model of the welded component into the crystal plastic welding process constitutive model to generate a crystal plastic constitutive model based on a fatigue damage and life assessment;

S33, assessing the fatigue damage and the fatigue life by the crystal plastic constitutive model based on the fatigue damage and life assessment and an extended finite element method.

Further, the damage model of the welded component in step S31 includes a welding damage variable and a welding damage increment.

The welding damage variable is calculated by the following formula:

$$D_{ij} = 1 - \left(\frac{\varepsilon_{ij}^{II}}{\varepsilon_{ij}^{III}}\right)^{1/n'},$$

where, $D_{ij}$ represents the welding damage variable; $\varepsilon_{ij}^{II}$ and $\varepsilon_{ij}^{III}$ represent a second-order strain rate and a third-order strain rate, respectively; and n' represents a material hardness coefficient;

The welding damage increment is calculated by the following formula:

$$dD = \frac{1}{(1-D)^\beta}\left(\frac{\bar{\sigma}}{\lambda}\right)^m dt,$$

where, dD represents the welding damage increment; $\bar{\sigma}$ represents a stress state parameter; dt represents a time increment; λ represents a fatigue toughness; D represents welding damage; β and m represent a material coefficient and a stress sensitivity parameter of the material, respectively.

Further, the crystal plastic constitutive model $N_f$ based on the fatigue damage and life assessment in step S32 is expressed by the following formula:

$$N_f = \frac{8GW_s}{\pi(1-v)d(\Delta\tau^\alpha - 2\tau_c^\alpha)^2},$$

where, G represents a shear modulus; $W_s$ represents surface energy per unit area; v represents a speed; d represents a length of a slip band; $\tau_c^\alpha$ represents a critical shear stress of the $\alpha^{th}$ slip system; and $\Delta\tau^\alpha$ represents an increment of the critical shear stress of the $\alpha^{th}$ slip system.

The advantages of the present disclosure are as follows. The present disclosure solves the problem that the macro-mesoscopic coupling behavior and fatigue damage and life prediction of materials are not considered during the numerical calculation of the welding process. Besides, the present disclosure provides a more comprehensive, more accurate and innovative macro-mesoscopic coupling calculation welding process model and algorithm, and the damage and life assessment model algorithm of the material on the mesoscopic scale. The mesoscopic model provided by the present disclosure is based on the macroscopic size and the microstructure characteristic of the material and formulated by the Voronoi algorithm, which has good compatibility and portability. Moreover, the effects of the crystal slip system and the inter-crystal plastic strain on the welding process performance of the material are considered in the crystal plastic welding process constitutive model and the calculation method of the present disclosure. On this basis, a welding damage and fatigue life assessment model is established on the mesoscopic scale. The related models and algorithms can be established to study the effect of microscopic characterizations of materials on the welding process performance, as well as on the fatigue damage and life of welded joints from the mesoscopic point of view. The relationship between the welding process and the evolution of the material performance can be determined by the macro-mesoscopic coupling calculation model to further determine the effect and degree of welding processes on the fatigue damage and life of materials, which provides significant theoretical guidance and technical support for studying the damage evolution and fatigue failure process of the materials, and has great scientific significance and engineering application value.

BRIEF DESCRIPTION OF THE DRAWINGS

FIGURE is a flow chart of the present disclosure;

DETAILED DESCRIPTION OF THE EMBODIMENTS

The specific embodiments of the present disclosure will be described hereinafter to facilitate skilled persons' understanding of the present disclosure. It should be noted that, the present disclosure is not limited to the scope of the specific embodiments, those skilled in the art can understand that various changes made within the spirit and scope of the claims of the present disclosure are obvious, and all inventions and creations utilizing the concept of the present disclosure are protected within the scope of the present disclosure.

As shown in FIGURE, the method for assessing fatigue damage and a fatigue life based on the crystal plastic welding process model includes the following steps:

S1, a crystal plastic welding computational mesh model is established based on a macroscopic model size and a microscopic characterization of a material.

Step S1 specifically includes the following steps:

S11, based on the macroscopic model size and information of the microscopic characterization of the material, the coordinate information of a crystal grain and a crystal nucleus on a mesoscopic scale of a welding area is generated by an image pixel discretization technology;

S12, the coordinate information of the crystal grain and the crystal nucleus is used to generate a two-dimensional crystal model map or a three-dimensional crystal model map by a Voronoi algorithm;

S13, the two-dimensional crystal model map or the three-dimensional crystal model map is used to generate a mesoscopic Voronoi crystal plastic mesh model by the finite element mesh generation software according to a requirement for a macroscopic simulation of a welding process;

S14, a mesh model is constructed by adding a property of the material, a parameter of the welding process and fixture constraint information to the mesoscopic Voronoi crystal plastic mesh model via computer engineering software; wherein the computer engineering software is designed and sold by Dassault Systems of Johnston, R.I., under the trademark Abaqus; and S15, when the mesh model is validated for eligibility, the mesh model is output; otherwise, the coordinate information of the crystal grain and the crystal nucleus are modified, and returning to step S12.

S2, a crystal plastic welding process constitutive model is established based on the crystal plastic welding computational mesh model.

Step S2 specifically includes the following steps:

S21, a parameter of the crystal grain on the mesoscopic scale of the material is determined based on the mesh model;

S22, a global coordinate elastic matrix is established according to the parameter of the crystal grain on the mesoscopic scale of the material;

S23, a rotation increment and an expansion strain increment of a slip system are calculated according to the global coordinate elastic matrix;

S24, an iterative algorithm for solving a linear equation and a nonlinear equation is constructed, and a key control parameter is selected to ensure a convergence of the iterative algorithm;

S25, the iterative algorithm is used to calculate a shear strain increment of the $n^{th}$ iteration and a shear strain increment of the $(n+1)^{th}$ iteration by the rotation increment and the expansion strain increment of the slip system;

S26, a consistent tangent stiffness matrix is iteratively calculated by the shear strain increment of the $n^{th}$ iteration and the shear strain increment of the $(n+1)^{th}$ iteration;

S27, when the consistent tangent stiffness matrix converges, proceeding to step S28, otherwise returning to step S24;

S28, a constitutive model is established by the consistent tangent stiffness matrix; and S29, the crystal plastic welding process constitutive model is established based on the constitutive model, a welding heat source theoretical model, and a macroscopic welding process parameter and constraint.

The welding heat source theoretical model includes a medium-energy welding heat source and a high-energy welding heat source.

The medium-energy welding heat source q(x, y, z, t) is calculated by the following formula:

$$q(x, y, z, t) = \frac{6\sqrt{3} f_f Q}{a_f bc\pi\sqrt{\pi}} e^{-3x^2/a_f^2} e^{-3y^2/b^2} e^{-3[z+v(\tau-t)]^2/c^2},$$

where, $f_f$ represents an energy coefficient of the front end of the ellipsoid; $a_f$ represents a radius of the ellipsoid; Q represents the total input energy; b represents a width of a molten pool; c represents a depth of the molten pool; x, y, and z respectively represent a parameter of the x-axis, a parameter of the y-axis, and a parameter of the z-axis in the rectangular coordinate system; v represents a welding speed; t represents welding time; and τ represents a hysteresis coefficient.

The high-energy welding heat source Q(x,y,z) is calculated by the following formula:

$$Q(x, y, z) = Q_0 \exp\left(-\frac{x^2 + y^2}{r_0^2(z)}\right),$$

where, $r_0$ represents a radius of a lower end of the high-energy welding heat source and $Q_0$ represents the total input energy.

S3, the fatigue damage and the fatigue life are assessed based on the crystal plastic welding process constitutive model.

Step S3 specifically includes the following steps:

S31, a damage model of a welded component is established according to a characteristic of a welded joint. The damage model of the welded component includes a welding damage variable and a welding damage increment.

The welding damage variable is calculated by the following formula:

$$D_{ij} = 1 - \left(\frac{\varepsilon_{ij}^{II}}{\varepsilon_{ij}^{III}}\right)^{1/n'},$$

where, $D_{ij}$ represents the welding damage variable; $\varepsilon_{ij}^{II}$ and $\varepsilon_{ij}^{III}$ represent a second-order strain rate and a third-order strain rate, respectively; and n' represents a material hardness coefficient.

The welding damage increment is calculated by the following formula:

$$dD = \frac{1}{(1-D)^\beta}\left(\frac{\bar{\sigma}}{\lambda}\right)^m dt,$$

where, dD represents the welding damage increment; $\bar{\sigma}$ represents a stress state parameter; dt represents a time increment; λ represents a fatigue toughness; D represents welding damage; β and m represent a sensitivity parameter of the material, respectively.

S32, the damage model of the welded component is integrated into the crystal plastic welding process constitutive model to generate a crystal plastic constitutive model based on a fatigue damage and life assessment. The crystal plastic constitutive model $N_f$ based on the fatigue damage and life assessment is expressed by the following formula:

$$N_f = \frac{8GW_s}{\pi(1-v)d(\Delta\tau^\alpha - 2\tau_c^a)^2},$$

where, G represents a shear modulus; $W_s$ represents surface energy per unit area; v represents a speed; d represents a length of a slip band; $\tau_c^a$ represents a critical shear stress of the $\alpha^{th}$ slip system; and $\Delta\tau^\alpha$ represents an increment of the critical shear stress of the $\alpha^{th}$ slip system.

S33, the fatigue damage and the fatigue life are assessed by the crystal plastic constitutive model based on the fatigue damage and life assessment and an extended finite element method.

What is claimed is:

1. A method for welding of a material based on a crystal plastic welding process model, comprising the following steps:
S1, establishing a crystal plastic welding computational mesh model based on a macroscopic model size and a microscopic characterization of the material;
S2, establishing a crystal plastic welding process constitutive model based on the crystal plastic welding computational mesh model; and
S3, assessing a fatigue damage and a fatigue life of the material based on the crystal plastic welding process constitutive model;
S4, welding the material based on the fatigue damage and the fatigue life of the material;
wherein, the step S1 specifically comprises the following steps:
S11, generating, by an image pixel discretization technology, coordinate information of a crystal grain and a crystal nucleus on a mesoscopic scale of a welding area based on the macroscopic model size and information of the microscopic characterization of the material;
S12, using, by a Voronoi algorithm, the coordinate information of the crystal grain and the crystal nucleus, to generate a two-dimensional crystal model map or a three-dimensional crystal model map;
S13, using, by finite element mesh generation software, the two-dimensional crystal model map or the three-dimensional crystal model map to generate a mesoscopic Voronoi crystal plastic mesh model according to a requirement for a macroscopic simulation of a welding process;
S14, constructing a mesh model by adding a property of the material, a parameter of the welding process and fixture constraint information to the mesoscopic Voronoi crystal plastic mesh model via computer engineering software; and
S15, when the mesh model is validated for eligibility, outputting the mesh model; when the mesh model is not validated for eligibility, modifying the coordinate information of the crystal grain and the crystal nucleus and returning to the step S12.

2. The method for welding of the material based on the crystal plastic welding process model according to claim 1, wherein, the information of the microscopic characterization of the material comprises scanning electron microscope (SEM) information, electron back-scattered diffraction (EBSD) information, and computed tomography (CT) information.

3. The method for welding of the material based on the crystal plastic welding process model according to claim 1, wherein, the step S2 specifically comprises the following steps:
S21, determining, based on the crystal plastic welding computational mesh model, a parameter of a crystal grain of the material on a mesoscopic scale;
S22, establishing a global coordinate elastic matrix according to the parameter of the crystal grain of the material on the mesoscopic scale;
S23, calculating a rotation increment and an expansion strain increment of a slip system according to the global coordinate elastic matrix;
S24, constructing an iterative algorithm, and selecting a key control parameter to ensure a convergence of the iterative algorithm; wherein the iterative algorithm is configured to solve a linear equation and a nonlinear equation S25, using the iterative algorithm to calculate a shear strain increment of an $n^{th}$ iteration and a shear strain increment of an $(n+1)^{th}$ iteration in the crystal plastic welding computational mesh model by the rotation increment and the expansion strain increment of the slip system;
S26, iteratively calculating a consistent tangent stiffness matrix by the shear strain increment of the $n^{th}$ iteration and the shear strain increment of the $(n+1)^{th}$ iteration in the crystal plastic welding computational mesh model;
S27, when the consistent tangent stiffness matrix converges, proceeding to the step S28, when the consistent tangent stiffness matrix fails to converge, returning to the step S24;
S28, establishing a constitutive model by the consistent tangent stiffness matrix; and
S29, establishing the crystal plastic welding process constitutive model based on the constitutive model, a welding heat source theoretical model, and a macroscopic welding process parameter and constraint.

4. The method for welding of the material based on the crystal plastic welding process model according to claim 3, wherein, the welding heat source theoretical model in the step S29 comprises a medium-energy welding heat source and a high-energy welding heat source;
the medium-energy welding heat source $q(x, y, z, t)$ is calculated by the following formula:

$$q(x, y, z, t) = \frac{6\sqrt{3} f_f Q}{a_f b c \pi \sqrt{\pi}} e^{-3x^2/a_f^2} e^{-3y^2/b^2} e^{-3[z+v(\tau-t)]^2/c^2},$$

where, $f_f$ represents an energy coefficient of a front end of an ellipsoid of the medium-energy welding heat source; $a_f$ represents a radius of the front end of the ellipsoid; Q represents total input energy; b represents a width of a molten pool; c represents a depth of the molten pool; x, y, and z respectively represent a first parameter of an x-axis, a first parameter of a y-axis, and a first parameter of a z-axis in a rectangular coordinate system; v represents a welding speed; t represents a welding time; and $\tau$ represents a hysteresis coefficient; and
the high-energy welding heat source $Q(x,y,z)$ is calculated by the following formula:

$$Q(x, y, z) = Q_0 \exp\left(-\frac{x^2 + y^2}{r_0^2(z)}\right),$$

where, $r_0$ represents a radius of a lower end of the high-energy welding heat source and $Q_0$ represents the total input energy; x, y, and z respectively represent a second parameter of the x-axis, a second parameter of the y-axis, and a second parameter of the z-axis in the rectangular coordinate system.

5. The method for welding of the material based on the crystal plastic welding process model according to claim 1, wherein, the step S3 specifically comprises the following steps:
  S31, establishing a damage model of a welded component according to a characteristic of a welded joint;
  S32, integrating the damage model of the welded component into the crystal plastic welding process constitutive model to generate a crystal plastic constitutive model based on a fatigue damage and life assessment; and
  S33, assessing the fatigue damage and the fatigue life of the material by the crystal plastic constitutive model based on the fatigue damage and life assessment and an extended finite element method.

6. The method for welding of the material based on the crystal plastic welding process model according to claim 5, wherein, the damage model of the welded component in the step S31 comprises a welding damage variable and a welding damage increment;
  the welding damage variable is calculated by the following formula:

$$D_{ij} = 1 - \left(\frac{\dot{\varepsilon}_{ij}^{II}}{\dot{\varepsilon}_{ij}^{III}}\right)^{1/n'},$$

where, $D_{ij}$ represents the welding damage variable; $\dot{\varepsilon}_{ij}^{II}$ and $\dot{\varepsilon}_{ij}^{III}$ represent a second-order strain rate and a third-order strain rate, respectively; and n' represents a material hardness coefficient; and the welding damage increment is calculated by the following formula:

$$dD = \frac{1}{(1-D)^{\beta}} \cdot \left(\frac{\tilde{\sigma}}{\lambda}\right)^m dt,$$

where, dD represents the welding damage increment; $\tilde{\sigma}$ represents a stress state parameter; dt represents a time increment; $\lambda$ represents a fatigue toughness; D represents welding damage; $\beta$ and m represent a material coefficient and a stress sensitivity parameter of the material, respectively.

7. The method for welding of the material based on the crystal plastic welding process model according to claim 5, wherein, the crystal plastic constitutive model $N_f$ based on the fatigue damage and life assessment in the step S32 is expressed by the following formula:

$$N_f = \frac{8GW_s}{\pi(1-v)d(\Delta\tau^{\alpha} - 2\tau_c^{\alpha})^2},$$

where, G represents a shear modulus; $W_s$ represents surface energy per unit area; v represents a speed; d represents a length of a slip band; $\tau_c^{\alpha}$ represents a critical shear stress of an $\alpha^{th}$ slip system; and $\Delta\tau^{\alpha}$ represents an increment of the critical shear stress of the $\alpha^{th}$ slip system.

* * * * *